US008127201B2

(12) United States Patent
Oda et al.

(10) Patent No.: US 8,127,201 B2
(45) Date of Patent: Feb. 28, 2012

(54) NONVOLATILE SEMICONDUCTOR MEMORY AND METHOD OF ACCESS EVALUATION TO THE SAME

(75) Inventors: Daisuke Oda, Tokyo (JP); Bunsho Kuramori, Tokyo (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 1079 days.

(21) Appl. No.: 12/007,875

(22) Filed: Jan. 16, 2008

(65) Prior Publication Data

US 2008/0184082 A1 Jul. 31, 2008

(30) Foreign Application Priority Data

Jan. 25, 2007 (JP) .................................. 2007-014814

(51) Int. Cl.
*G11C 29/00* (2006.01)
(52) U.S. Cl. ........................................ 714/764; 714/718
(58) Field of Classification Search .............. 714/6, 718, 714/720, 777, 719, 763, 764, 768
See application file for complete search history.

(56) References Cited

U.S. PATENT DOCUMENTS

| 6,237,116 B1* | 5/2001 | Fazel et al. ..................... 714/720 |
| 6,938,193 B1* | 8/2005 | Honda .......................... 714/720 |
| 7,225,390 B2* | 5/2007 | Ito et al. ........................ 714/777 |
| 2007/0050668 A1* | 3/2007 | Gans ................................. 714/6 |
| 2008/0184082 A1* | 7/2008 | Oda et al. ...................... 714/718 |

FOREIGN PATENT DOCUMENTS

| JP | H10-334696 A | 12/1998 |
| JP | 2005-346887 A | 12/2005 |

* cited by examiner

*Primary Examiner* — David Ton
(74) *Attorney, Agent, or Firm* — Rabin & Berdo, P.C.

(57) ABSTRACT

A nonvolatile memory includes a memory cell array having multiple memory cells, a read-out circuit outputting data stored in the memory cell array asynchronously in response to an input address signal, a selection circuit outputting a selection signal for selecting a location of the memory cell to fail, an error making circuit receiving a test mode signal, making the data outputted from the read-out circuit fail so that the failed data have an error, and outputting the failed data in response to the selection signal when the test mode signal is activated, and outputting the data outputted from the read-out circuit when the test mode signal is not activated, a data latch circuit latching either the failed data or the data outputted from the read-out circuit and outputting the latched data, and an error correcting circuit detecting the error in the latched data, correcting the error, and outputting the corrected signal.

14 Claims, 11 Drawing Sheets

NONVOLATILE SEMICONDUCTOR MEMORY AND METHOD OF ACCESS EVALUATION TO THE SAME

CROSS-REFERENCE TO RELATED APPLICATION

This application claims the priority benefit of Japanese Patent Application No. 2007-014814, filed Jan. 25, 2007, the entire disclosure of which is incorporated herein by reference.

BACKGROUND OF THE INVENTION

1. Field of the Invention

The invention relates to an asynchronous nonvolatile semiconductor memory having an error correcting function, and a method of an access evaluation of the nonvolatile memory, specifically of evaluating a time delay caused by an error correction in order to assure the delay.

2. Description of the Related Art

The following Japanese patent documents disclose asynchronous nonvolatile semiconductor memories (hereinafter simply called "a nonvolatile memory") having an ECC (Error Correcting Circuit), such as a Mask ROM (Read Only Memory), a PROM (Programmable Read Only Memory), an EPROM (Electrically Programmable Read Only Memory), an E²PROM (Electrically Erasable Programmable Read Only Memory), a FeRAM (Ferroelectric Random Access Memory) and a Flash memory.

Japanese patent Ref. No. H10-334696
Japanese patent Ref. No. 2005-347887

FIG. 11 shows a circuit diagram of an asynchronous nonvolatile memory 1 having an ECC in the related arts. The nonvolatile memory 1 includes a memory cell array 10 in which data are stored. The memory cell array 10 includes a plurality of word lines WL and a plurality of bit lines BL, each of which is perpendicular to the word lines WL. A memory cell 11 is formed at each intersection of the word lines WL and the bit lines BL, so that the memory cells 11 are disposed in a matrix. Each memory cell includes a transistor whose control gate is connected to one of the word lines WL, whose source is connected to one of the bit lines BL, and whose drain is connected to the power supply terminal via an unillustrated switching element. Such a transistor of the memory cell 11 further includes a floating gate. The memory cell in which electrons are injected onto its floating gate is recognized as the memory cell having data "1". When electrons are not injected onto the floating gate in the memory cell, such a memory cell is recognized as the memory cell having data "0".

The word lines WL are connected to a row address decoder 12, and the bit lines BL are connected to a column address decoder 13. The row address decoder 12 is a circuit for activating one of the word lines WL by selecting a desired row address from (A+1)-bit input addresses Ain [A:0](A=0, 1, 2, . . . A). The column address decoder 13 is a circuit for activating one of the bit lines BL by selecting a desired column address from the input addresses Ain [A:0], and is connected to a read amplifier circuit (hereinafter called "a read AMP") 14.

The read AMP 14 amplifies a read-out signal outputted through the bit line BL controlled by the column address decoder 13 and outputs the amplified signal AMP_OUT [N:0] (N=0, 1, 2 . . . 127), and the output of the read AMP 14 is connected to a data latch circuit 15. The data latch circuit 15 latches the amplified signal AMP_OUT [N:0] and outputs the latched signal LATCH_OUT [N:0], and the output of the data latch circuit 15 is connected to an ECC 16. The ECC 16 as shown in the Japanese patent Ref. No. H10-334696 described above includes a plurality of exclusive OR gates (hereinafter called "an XOR gate") and a plurality of AND gates. The ECC 16 receives the latched signal LATCH_OUT [N:0], and detects one-bit errors from data bits and a parity bit. When the ECC 16 does not find any errors, then it outputs an ECC output signal ECC_OUT [N:0] without delay from the time the latched signal LATCH_OUT [N:0] was inputted. After that, the memory 1 outputs the output data DATA_OUT [N:0] after a predetermined period during which the output data are transferred from the ECC 16 to the output terminal for external devices. When the ECC 16 finds a one-bit error, it corrects the one-bit error by an arithmetic operation for correction and outputs the corrected output data DATA_OUT [N:0].

FIG. 12 is a timing chart showing a read-out operation of the nonvolatile memory 1 in the case that the there is no defects in a selected memory cell 11.

In the read-out operation of the nonvolatile memory 1 having no defects in its memory cells, the input address Ain [A:0] is applied to the row address decoder 12 and the column address decoder 13 at the time t1, then a single memory cell 11 is selected by the row address decoder 12 and the column address decoder 13. An electric current flowing from the selected memory cell 11 is amplified for an expectation-determination by the read AMP 14 at the time t2. The amplified signal AMP_OUT [N:0] showing the expectation as a result of the determination is latched in the data latch circuit 15 at the time t3. Since the amplified signal AMP_OUT [N:0] is latched in the data latch circuit 15 once, the stable signal that is the latched signal LATCH_OUT [N:0] is inputted to the ECC 16. If there are no expectation error in the latched signal LATCH_OUT [N:0], no arithmetic operation for correction is performed. Thus, no delay occurs between the time when the latched signal LATCH_OUT [N:0] is inputted to the ECC 16 and the time when the output data DATA_OUT[N:0] is outputted. Thus, the memory 1 outputs the output data DATA_OUT [N:0] at the time t4 after a predetermined period during which the output data are transferred from the ECC 16 to the output terminal for external devices.

FIG. 13 is a timing chart showing the read-out operation of the nonvolatile memory 1 in the case that the there is a defect in a selected memory cell 11.

In the read-out operation of the nonvolatile memory 1 having the defect in its memory cell, when there is an expectation bit failure in the latched signal LATCH_OUT [N:0], the arithmetic operation for correction is performed in the ECC 16. Thus, while the latched signal LATCH_OUT [N:0] is inputted at the time t3, the ECC 16 outputs the ECC corrected output signal ECC_OUT [N:0] at the time t4 because of the process time of the arithmetic operation for correction. Thus, a time delay occurs between the time when the latched signal LATCH_OUT [N:0] is inputted to the ECC 16 and the time when the output data DATA_OUT[N:0]. For this reason, the memory 1 outputs the output data DATA_OUT [N:0] at the time t5 after a predetermined period during which the output data are transferred from the ECC 16 to the output terminal for the external devices because of the time delay caused by the ECC 16.

As explained above, the output data DATA_OUT [N:0] is outputted at the time t4 when the selected memory cell has no defects while it is outputted at the time t5 when the selected memory cell has a defect. Since the time of the output is different in accordance with the existence of the defect, it is required to perform the access evaluation including the delay caused by the ECC's arithmetic operation for correction before sipping shipping the nonvolatile memory 1 from a manufacture to customers. In other words, the read-out data from each memory cell of the nonvolatile memory 1 should be evaluated at the access timing that includes the delay for the arithmetic operation for correction is included, that is, at the time t5.

This is because of the following reason. As described above, the data "1" or "0" are stored on the floating gate of each memory cell 11, depending on the condition that the electrons are injected thereon. After the shipment of the nonvolatile memory 1 having data in its memory cell 11, the electrons in a certain memory cell 11 are sometimes erased by an accident, such as a retention characteristic change of memory cells. If it happens, the memory data is changed. It is unpredictable in which memory cell the retention characteristic change occurs. In other words, this phenomenon may occur in any of the memory cells 11. For the manufacture, it is necessary to consider that the memory data is changed after the shipment in order to maintain the product liability. Thus, before the shipment of the nonvolatile memory 1, the read-out data should be evaluated by setting the nonvolatile memory 1 in the condition that its memory data is changed (that is the condition that the defect is found in the memory cell). Accordingly, the ECC 16 delays the timing of its output under the condition that the defect exists in a certain memory cell because of the arithmetic operation for correction.

However, any nonvolatile memory 1 having a defect cell is removed from the production line in an advance memory test by a manufacturer. Thus, no memory cells having an expected error are included in the nonvolatile memory 1 for shipping. Thus, the access evaluations are only performed at the timings t1-t4 illustrated in FIG. 12. Furthermore, the access evaluations cannot be performed at the timings t1-t5 illustrated in FIG. 13 for all variations of the expected error in the memory cell.

SUMMARY OF THE INVENTION

An objective of the invention is to solve the above-described problem and to provide an asynchronous nonvolatile semiconductor memory having an error correcting function, which causes an error in the memory cell intentionally for the access evaluation purpose, and a method of an access evaluation of the nonvolatile memory.

The objective is achieved by a nonvolatile semiconductor memory, including a memory cell array having a plurality of nonvolatile memory cells, a read-out circuit outputting data stored in the memory cell array asynchronously in response to an input address signal, a selection circuit outputting a selection signal for selecting a location of the memory cell to fail, an error making circuit receiving a test mode signal, making the data outputted from the read-out circuit fail and outputting the failed data in response to the selection signal when the test mode signal is activated, and outputting the data outputted from the read-out circuit when the test mode signal is not activated, a data latch circuit latching either the failed data or the data outputted from the read-out circuit and outputting the latched data, and an error correcting circuit detecting the error in the latched data, correcting the error, and outputting the corrected signal.

BRIEF DESCRIPTION OF THE DRAWINGS

The invention will be more particularly described with reference to the accompanying drawings, in which.

DETAILED DESCRIPTION OF THE PREFERRED EMBODIMENTS

The preferred embodiments of the invention are explained together with drawings as follows. In each drawing and in each embodiment of the invention, the same reference numbers designate the same or similar components.

The First Embodiment

[Circuitry]

Figure 1:
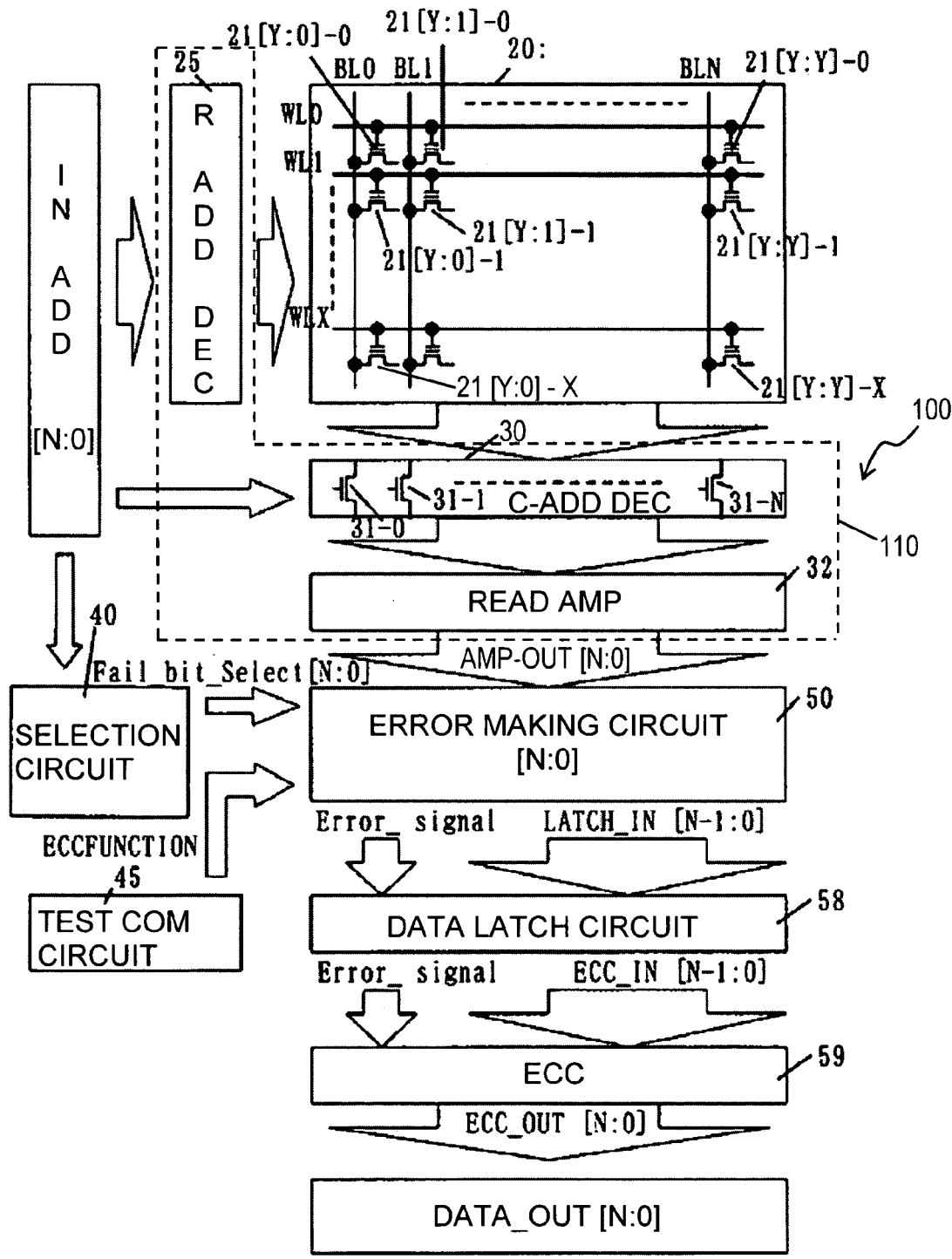
FIG. 1 is a circuit diagram of an asynchronous nonvolatile semiconductor memory having an error correcting function, according to the first embodiment.

FIG. 1 is a circuit diagram of an asynchronous nonvolatile semiconductor memory 100 (as described above, hereinafter called "a nonvolatile memory") having an error correcting function, such as an EPROM, according to the first embodiment. The nonvolatile memory 100 includes a memory cell array 20 for storing data. The memory cell array 20 includes a plurality of word lines WL (WL0-WL 127) and a plurality of bit lines BL (BL0-BL 127), each of which is perpendicular to the word lines WL. Although it is defined in the first embodiment that the number of word lines WL is set at 128, which includes one hundred twenty seven (127) word lines for a data bits, and one word line for parity bit, and the number of bit lines BL is set at 128, which includes one hundred twenty seven (127) bit lines for data bits, and one bit line for a parity bit, the number of word lines and number of the bit lines can be changed. Namely, it can be described that the memory cell array 20 includes a number (X+1) of word lines WL (wherein X=1, 2, 3 . . . ) and a number (Y+1) of bit lines BL (wherein Y=1, 2, 3 . . . ), each of which is perpendicular to the word lines WL.

At every intersection of the word lines and the bit lines, nonvolatile memory cells 21 (21[127:0]-0~21[127:127]-0,21 [127:0]-1~21[127:127]-1 . . . 21[127:0]-127~21[127:127]-127) are formed in the first embodiment, and thus, they are disposed in a matrix. Since the number of nonvolatile memory cells depends on the number of bit lines and word lines, the number of nonvolatile memory cells is changed if the number of bit lines and word lines is changed. Thus, it can also be described that the nonvolatile memory cells 21 (21[y:0]-0~21 [Y:Y]-X) at every intersection[[s]] of the word lines and the bit lines.

Each nonvolatile memory cell 21 includes a transistor whose control gate is connected to one of the word lines WL, whose source is connected to one of the bit lines BL, and whose drain is connected to the power supply terminal via an unillustrated switching element. Such transistor of each memory cell 21 further includes a floating gate. The memory cell 21 in which electrons are injected onto its floating gate is recognized as the memory cell having data "1". When electrons are not injected onto the floating gate in the memory cell 21, such memory cell 21 is recognized as the memory cell 21 having data "0".

The word lines WL are connected to a row address decoder 25, and the bit lines BL are connected to a column address decoder 30. The row address decoder 25 is a circuit for activating one of the word lines WL by selecting a desired row address from 128-bit input addresses Ain [A:O](A=O, 1, 2, . . . 127). The column address decoder 30 is a circuit for activating one of the bit lines BL by selecting a desired column address from the 128-bit input addresses Ain [A:O], and is connected to a read amplifier circuit (hereinafter called "a read AMP") 32. The column address decoder 30 includes one hundred twenty-eight of MOS transistors 31 (31-0-31-127). The number of MOS transistors depends on the number of bit lines BL, that is, the number of MOS transistors is the same as that of the bit lines BL. Thus, a read-out circuit 110 includes the row address decoder 25, the column address decoder 30 and the read amplifier circuit 32.

The read AMP 32 amplifies a read-out signal outputted through the bit line BL controlled by the column address decoder 30 and outputs the amplified signal AMP_OUT [N:0] (N=0, 1, 2 . . . 127), and the output of the read AMP 32 is connected to a plurality of error making circuits 50, which are controlled by an output signal of selection circuit 40, which selects one of the memory cells as a fail-bit, and by an output signal of a test command circuit 45. The number of error making circuits 50 depends on the number of input bits. Thus, if the number of input bits is set at (N+1), then the number of error making circuits 50 is set at [N:0]. The selection circuit 40 selects one of the memory cell 21 as a fail-bit in response to the input address Ain [N:0], and outputs a fail bit selection signal FAIL_BIT_SELECT [N:0] to the error making circuits 50. The test command circuit outputs a test mode signal ECCFunction, for putting the nonvolatile memory 100 in the test mode state, to the error making circuits 50.

When the test mode signal ECCFunction is in the activated state, the error making circuits 50 outputs a one-bit error signal ERROR_SIGNAL in which a part (for example, 1 bit) of data in the amplified signal AMP_OUT [N:O] fails is failed and an N-bit read-out signal, which is a latch-in signal LATCHJN [N−1:0] to a data latch circuit 58 in response to the fail bit selection signal FAIL_BIT SELECT [N:O]. When the test mode signal ECCFunction is not in the activated state, the error making circuits 50 outputs the amplified signal AMP_OUT [N:O] as the latch-in signal LATCH_IN [N−1:0] to a data latch circuit 58 whose input is connected to the output of the error making circuits 50. The data latch circuit 58 latches the output signal from the error making circuits 50 at a predetermined timing, and outputs an (N+1)-bit ECC-in signal ECC_IN [N:O] or the one-bit error signal ERROR_SIGNAL with the N-bit ECC-in signal ECCJN [N−1:0] as a latched signal to an ECC 59 whose input is connected to the output of the data latch circuits 58.

The ECC 59 includes a plurality of eXclusive OR gates (hereinafter called "an XOR gate") and a plurality of AND gates. The ECC 16 receives the latched signal outputted from the data latch circuit 58 and detects a one-bit error from data bits and a parity bit or detects the existence of the one-bit error signal ERROR_SIGNAL. When the ECC 16 does not find any errors or does not detect the one-bit error signal ERROR_SIGNAL, then it outputs its input signal as an output data DATA_OUT [N:0]. When the ECC 16 finds a one-bit error or detects the one-bit error signal ERROR_SIGNAL, it corrects the one-bit error by an arithmetic operation for correction and outputs the corrected output data DATA_OUT [N:0] as an ECC-out signal ECC_OUT [N:0].

Figure 2:
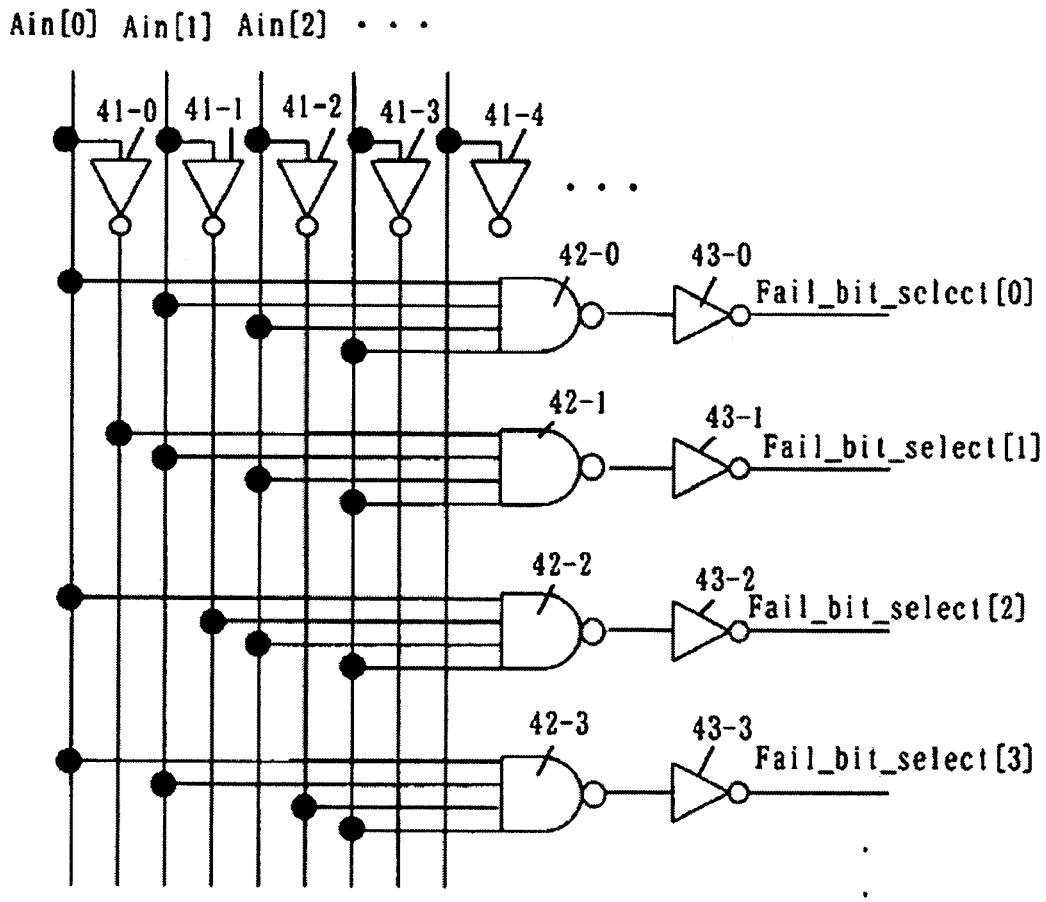
FIG. 2 is a circuit diagram of a selection circuit for selecting one of the memory cells in the memory of FIG. 1.

FIG. 2 is a circuit diagram of the selection circuit 40 for selecting one of the memory cells 21 in the memory 100 of FIG. 1. The selection circuit 40 includes a plurality of inverters 41 (41-0-41-N) for inverting the (A+1)-bit input addresses Ain [A:O] (Ain [0]-Ain [N]) and a plurality of NAND gates 42 (42-0-42-$2^{A+1}$) each having input terminals for (A+1)-bit inputs, and a plurality of inverters 43 (43-0-43_$2^{A+1}$) inverting the output signal from each NAND gates 42 and outputting the ($2^{A+1}$+1)-bit fail bit selection signal FAIL_BIT_SELECT [N:0] (=FAIL_BIT_SELECT [0] 5−FAIL_BIT SELECT [$2^{A+1}$]). The number of inverters 41 is set at (A+1). The number of NAND gates 42 is set at $2^{A+1}$. The number of inverters 43 is also set at $2^{A+1}$. Each NAND gate 42 performs the NAND operation with the predetermined combination of the (A+1)-bit input address Ain [A:O] and the output signal(s) of the inverters 41.

Figure 3:
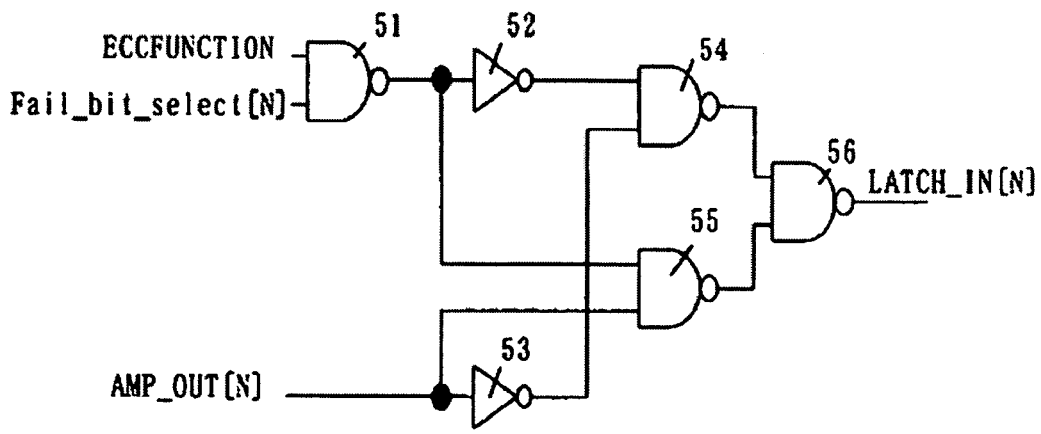
FIG. 3 is a circuit diagram of an error making circuit of the asynchronous nonvolatile semiconductor memory of FIG. 1.

FIG. 3 is a circuit diagram of one of the error making circuits 50 of the nonvolatile memory 100 of FIG. 1. The error making circuit 50 includes a two-input NAND gate 51, which receives the test mode signal ECCFunction and the fail bit selection signal FAIL_BIT_SELECT [N:0], an inverter 52 for inverting the output signal of the NAND gate 51, an inverter 53 for inverting the amplified signal AMP_OUT [N], a two-input NAND gate 54, which receives the output signals from the inverters 52 and 53, a two-input NAND gate 55, which receives the output signal of the NAND gate 51 and the amplified signal AMP_OUT [N], and a two-input NAND gate 56, which receives the output signals from the NAND gates 54 and 55 and outputs the latch-in signal LATCH_IN [N].

[Operation]

Figure 4:
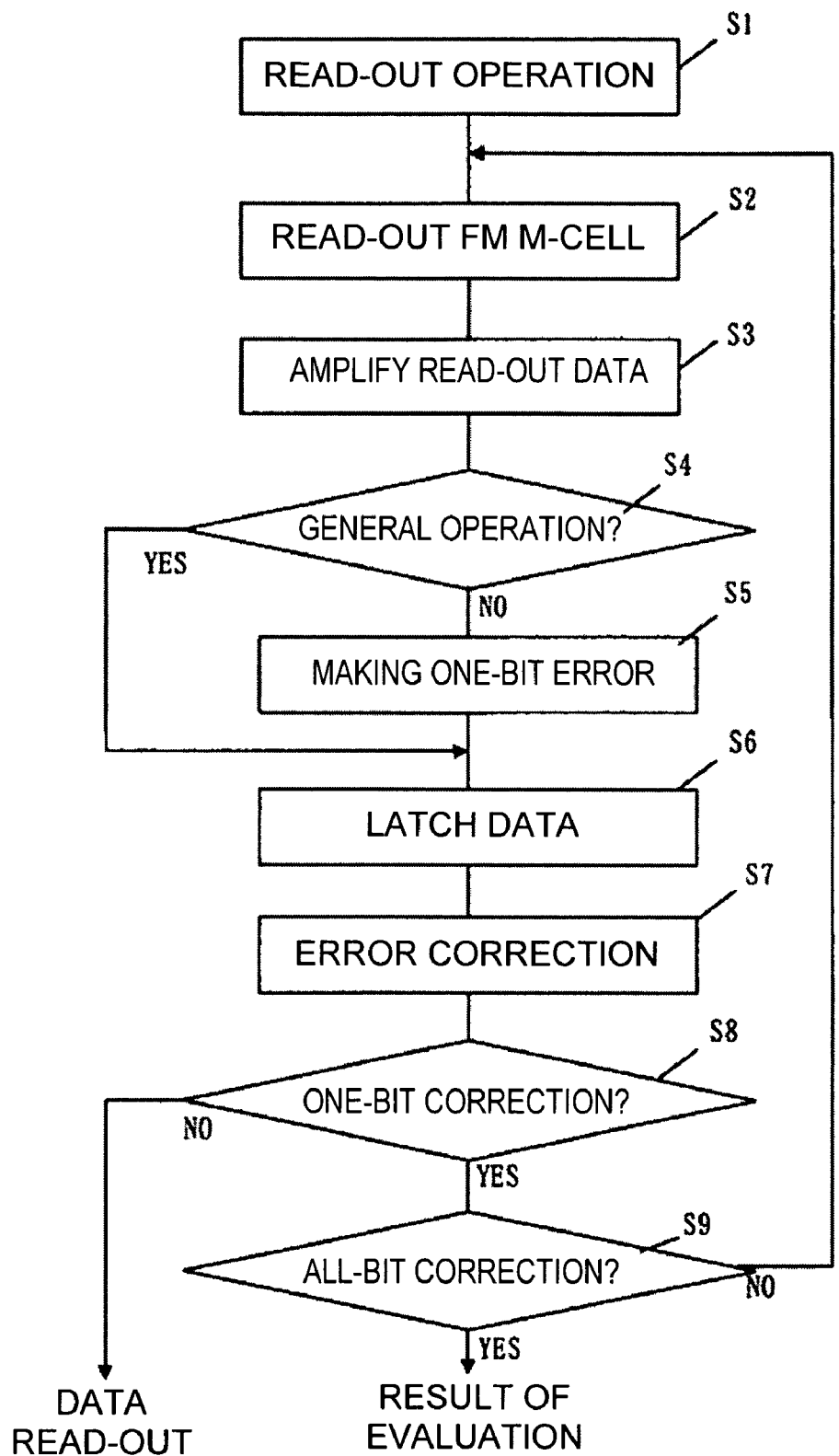
FIG. 4 is a flow chart showing a method of an access evaluation for the asynchronous nonvolatile semiconductor memory of FIG. 1.
Figure 5:
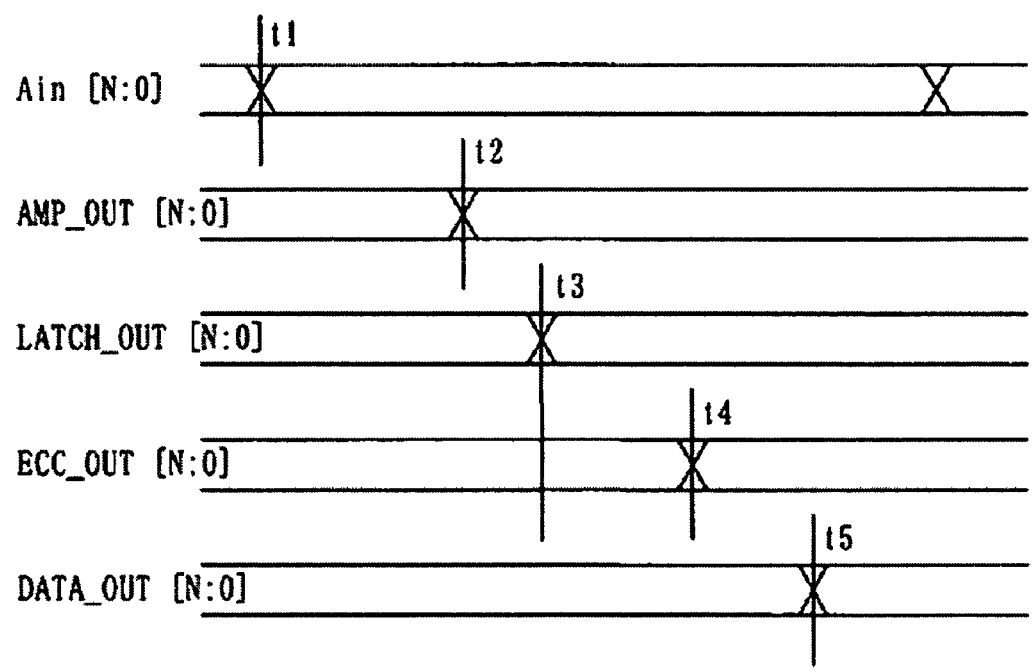
FIG. 5 is a timing chart of the asynchronous nonvolatile semiconductor memory of FIG. 1 in the case that one (1)-bit error is created intentionally by the error making circuit.

The operation is explained as follows with reference to FIG. 4 and FIG. 5. FIG. 4 is a flow chart showing a method of an access evaluation for the nonvolatile memory 100 of FIG. 1, and FIG. 5 is a timing chart of the nonvolatile memory 100 of FIG. 1 in the case that one (1)-bit error is created intentionally by the selected error making circuit 50.

In the step S1 at the time t1, the read-out operation is started by providing the input address Ain [N:0] from an external device. In the Step S2, a plurality of the memory cells 21 are selected by the row address decoder 25 and the column address decoder 30, and the data stored in the selected memory cell 21 are read-out. In the Step S3 at the time t2, the read-out data from the selected memory cell 21 are amplified by the read AMP 32, and then the read AMP 32 outputs the amplified signal AMP_OUT [N:0] to the error making circuits 50. On the other hand, in response to the input address Ain [N:0], the selection circuit 40 outputs the fail bit selection signal FAIL_BIT_SELECT [N:0] to the error making circuits 50.

Under the general operation ("Yes" in the Step S4 of the FIG. 4), the test mode signal ECCFunction, which is outputted from the test command circuit 45, is inactivated. Thus, as shown in FIG. 3, the amplified signal AMP_OUT [N:0] is transferred via the NAND gates 55 and 56, and is outputted from the error making circuits 50 as the latch-in signal LATCH_IN [N:0] so that it is latched at the data latch circuit 58, in the Step S6. Then, in the Step S7, if the ECC 59 detects the bit error in the ECC-in signal ECC_IN [N:0] outputted from the data latch circuit 58, one-bit error is corrected by the ECC 59. If the ECC 59 detects no bit error in the ECC-in signal ECC_IN [N:0], then the ECC-in signal ECC_IN [N:0] is not corrected and is outputted as the output data DATA_OUT [N:0] following "No" in the Step S8. As described above, under the general operation, since the amplified signal AMP_OUT [N:0] is simply transferred to the data latch circuit 58 through the error making circuits 50, the general read-out operation is performed smoothly without making any time delay or other problem.

To the contrary, under the non-general operation ("No" in the Step S4 in the FIG. 4), the test mode signal ECCFunction, which is outputted from the test command circuit 45, is activated, and one of the error making circuits 50 is selected. In Step S5, the amplified signal AMP_OUT [N] is inverted by the inverter 53 and the NAND gates 54 and 56, and then the inverted signal is outputted from the selected error making circuit 50 as the Latch-in signal LATCH_IN [N]. As a result, in the Step S6 at the time t3, data having one (1)-bit error are stored in the data latch circuit 58.

For this reason, the ECC-in signal ECC_IN[N:0] outputted from the data latch circuit 58 includes one (1)-bit error. When such the ECC-in signal ECC_IN[N:0] having one (1)-bit error is inputted into the ECC 59 in the Step S7 at the time t4, the arithmetic operation for correction is performed in the ECC 59. Thus, in the Step 8, it is possible to evaluate the output data DATA_OUT [N:0] at the access timings including the timing t5, at which delay caused by the arithmetic operation has occurred. Furthermore, since the selected error making circuit 50 makes an error bit in the desired memory cell 21, the access evaluation for all kinds of error patterns including the time delay for the arithmetic operation for correction of each error pattern can be performed by repeating the operation following "No" in the Step S9.

Figure 6:
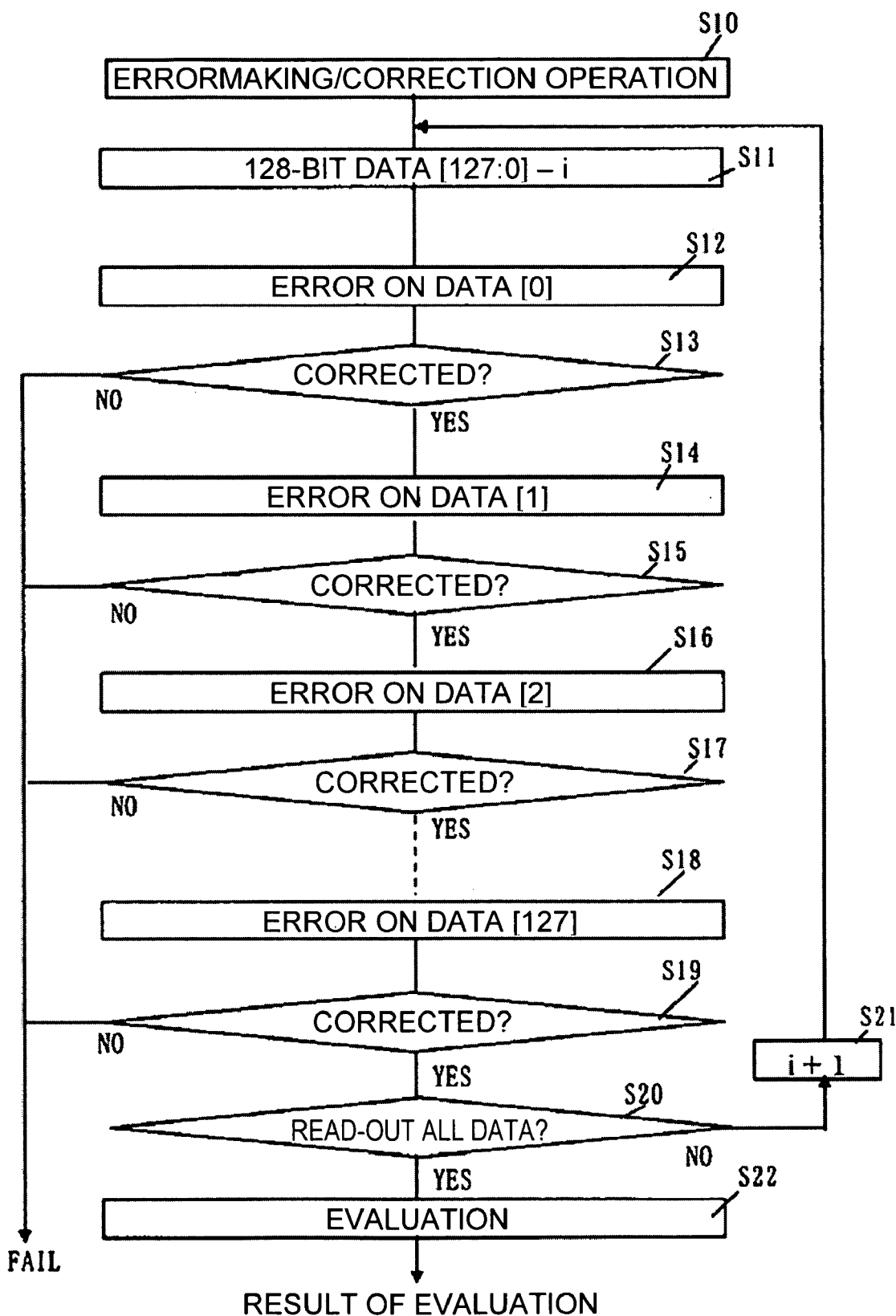
FIG. 6 is a flow chart showing a specific process sequence of the access evaluation method illustrated in FIG. 4

FIG. 6 is a flow chart showing a specific process sequence of the access evaluation method illustrated in FIG. 4. In the nonvolatile memory 100 shown in FIG. 1, the selection circuit 40 can select the desired one of the memory cells 21. Thus, it is possible to evaluate the delay caused by the arithmetic operation for one-bit correction to a single data group (for example, 128-bit data [127:0]-1 are considered as the single data group where Y=128 in the memory cells 21[Y:0]-1~21 [Y:Y]-1 whose gates are connected to the word line WL0).

In other words, since the ECC 59 corrects the error signal ERROR_SIGNAL having one-bit error out of the (N+1) bits, the output signals from the error making circuit 50 includes the one-bit error signal ERROR_SIGNAL and the N-bit Latch-in signal LATCH_IN [N−1:0], and the output signals from the data latch circuit 58 includes the one-bit error signal ERROR_SIGNAL and the N-bit ECC-in signal ECC_IN [N−1:0], which is substantially the same as the N-bit Latch-in signal LATCH_IN [N−1:0].

Thus, if 128 memory cells are connected to one word line WL 0, 128 error making circuits 50 create the bit error on the first memory cell 21 [127:0]-0, the ECC 59 corrects the bit error, and then the corrected signal ECC_OUT is outputted as described in the Steps S10S13 in FIG. 6. Then, 128 error making circuits 50 create the bit error on the second memory cell 21 [127:1]-0, the ECC 59 corrects the bit error, and then the corrected signal ECC_OUT is outputted as described in the Steps S14-S15 in FIG. 6. After that, 128 error making circuits 50 create the bit error on the third memory cell 21 [127:2]-0 through one hundred twenty eighth memory cell 21 [127:127]-0 sequentially, the ECC 59 corrects each bit error, and then each corrected signal ECC_OUT is outputted as described in the Steps S14S20 in FIG. 6. If the answer is "NO" in one of the Steps S13, S15, S17, S19, then the nonvolatile memory 100 under the test mode is judged as defective (FAIL).

As described above, the read-out data from all memory cells connected to one word line are evaluated at the timing including the delay caused by the arithmetic operation for correction. As well as the access evaluation of the read-out data from the memory cells connected to the word line WL0, the access evaluation of the read-out data from other memory cells connected to each of the word lines WL1~WLX can be performed in Step S21 in FIG. 6.

[Advantage]

According to the first embodiment of the invention, since the error making circuits 50 for making a one-bit error is formed between the read AMP 32 and the data latch circuit 58, it is possible to include one-bit error signal ERROR_SIGNAL intentionally in the data ECC_IN [N:0], which are inputted to the ECC 59. Thus, the access evaluation including the delay caused by the arithmetic operation for correction can be performed before the shipment of the nonvolatile memory 100 so that the evaluation satisfying the access standard to the sample products can be performed.

The Second Embodiment

Figure 7:
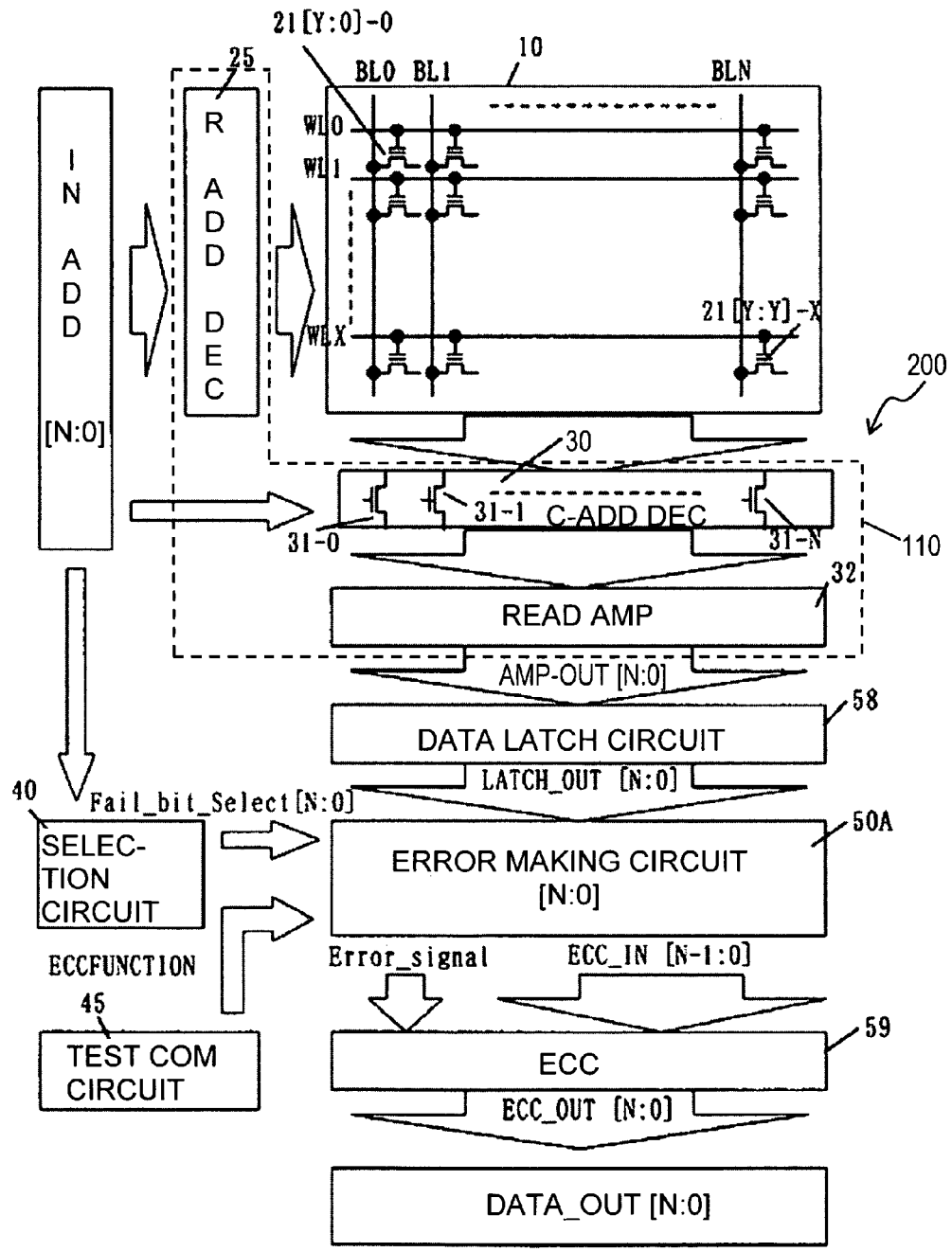
FIG. 7 is a circuit diagram of an asynchronous nonvolatile semiconductor memory having an error correcting function, according to the second embodiment.

The second embodiment is explained as follows with reference to FIG. 7~FIG. 9. FIG. 7 is a circuit diagram of an asynchronous nonvolatile semiconductor memory having an error correcting function, according to the second embodiment. As described above, in each drawing and in each embodiment, the same reference numbers used in FIGS. 7~9 designate the same or similar components used in the first embodiment.

[Circuitry]

In the first embodiment, since the error making circuits 50 for making a one-bit error is formed between the read AMP 32 and the data latch circuit 58, the amplified signal AMP_OUT [N:0] under the general operation is also required to pass through the error making circuit 50 in order to be reached to the data latch circuit 58. Thus, the amplified signal AMP_OUT [N:0] may not be held in the data latch circuit 58 stably.

According to the second embodiment, a plurality of error making circuits 50A, each of which has the same components as one of the error making circuits 50 used in the first embodiment, are disposed between the data latch circuit 58 and the ECC 59, each of which has the same components as the data latch circuit 58 and the ECC 59 used in the first embodiment. The number of the error making circuits 50A corresponds to that of the ECC_IN [N:0], and the error making circuits 50A receive the fail bit selection signal FAIL_BIT_SELECT [N:0] outputted from the selection circuit 40 and a test mode signal ECCFunction outputted from the test command circuit 45 as well as the first embodiment. The other circuit configuration in the second embodiment is substantially the same as that in the first embodiment.

Figure 8:
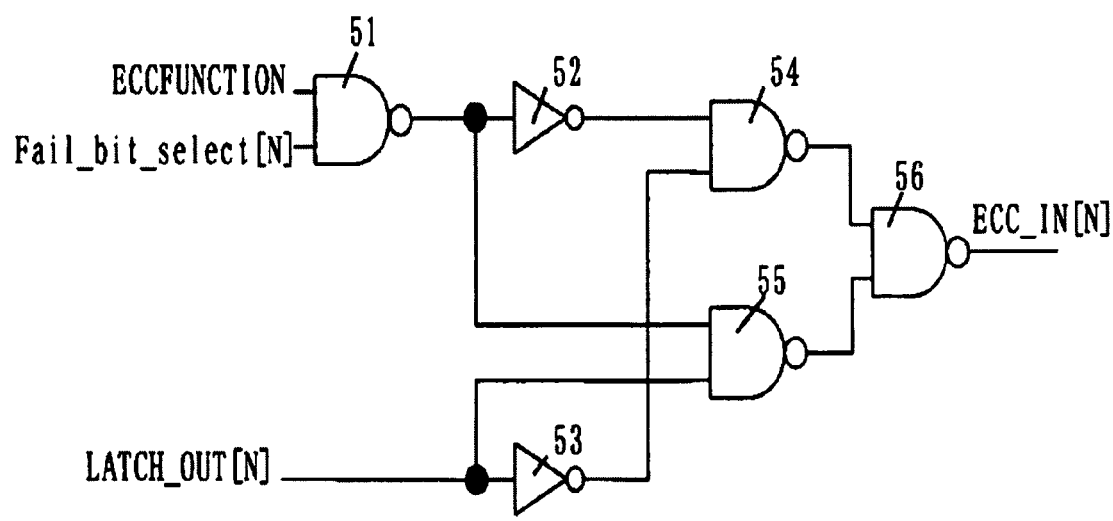
FIG. 8 is a circuit diagram of an error making circuit of the asynchronous nonvolatile semiconductor memory in the memory of FIG. 7.

FIG. 8 is a circuit diagram of the error making circuit 50A of the asynchronous nonvolatile semiconductor memory in the memory of FIG. 7. In FIG. 8, the same reference numbers designate the same or similar components used in the first embodiment shown in FIG. 3.

As shown in FIG. 8, the error making circuit 50A includes a two-input NAND gate 51, which receives the test mode signal ECCFunction and the fail bit selection signal FAIL_BIT_SELECT [N:0], an inverter 52 for inverting the output signal of the NAND gate 51, an inverter 53 for inverting the latched signal LATCH_OUT [N], a two-input NAND gate 54, which receives the output signals from the inverters 52 and 53, a two-input NAND gate 55, which receives the output signal of the NAND gate 51 and the latched signal LATCH_OUT [N], and a two-input NAND gate 56, which receives the output signals from the NAND gates 54 and 55 and outputs the ECC-in signal ECC_IN [N].

[Operation]

Figure 9:
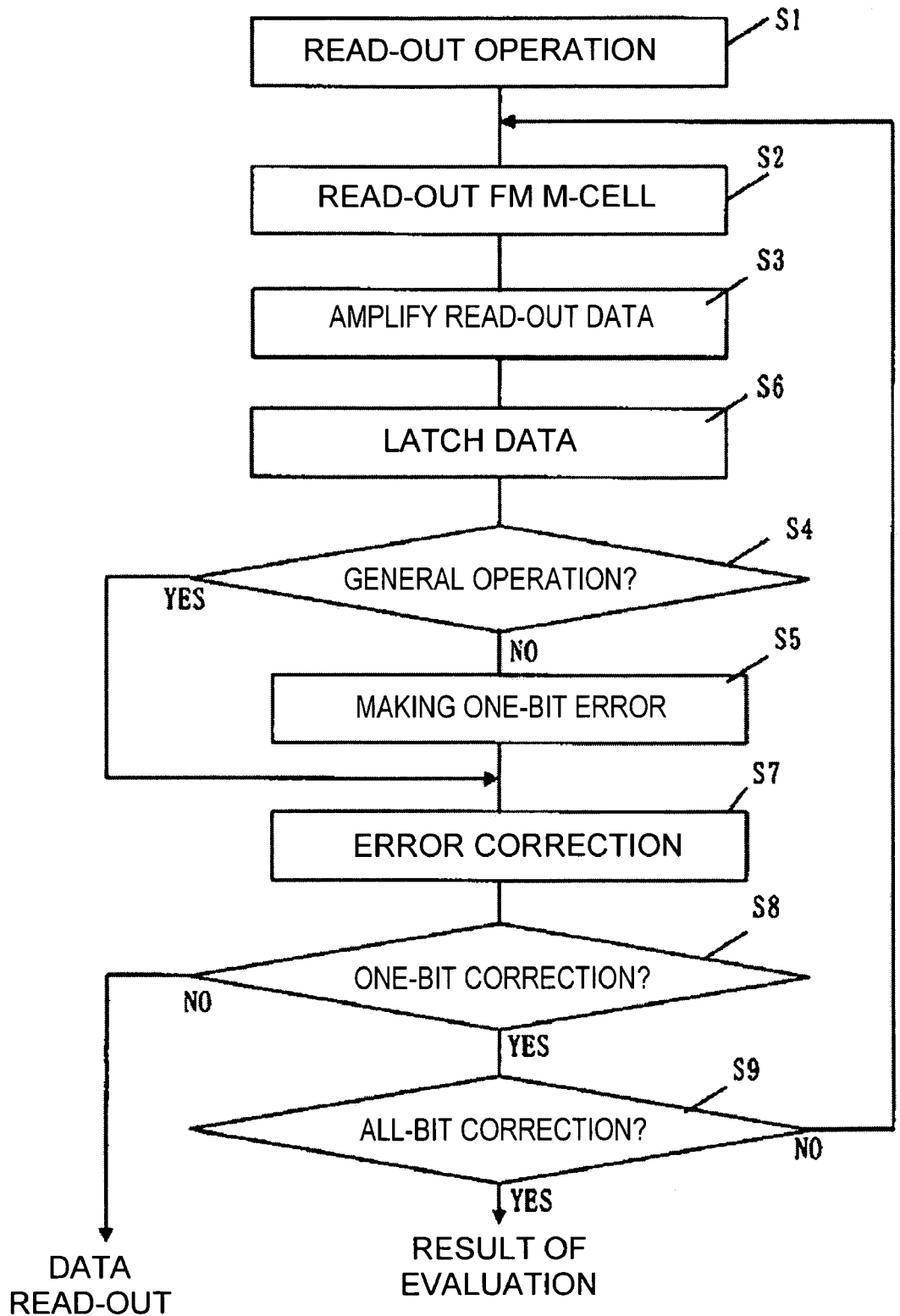
FIG. 9 is a flow chart showing a method of an access evaluation for the asynchronous nonvolatile semiconductor memory of FIG. 7.

FIG. 9 is a flow chart showing a method of an access evaluation for the asynchronous nonvolatile semiconductor memory of FIG. 7. In FIG. 9, the same reference numbers designate the same or similar components used in the first embodiment shown in FIG. 4.

In the step S1 in FIG. 9 at the time t1 in FIG. 5, the read-out operation is started by providing the input address Ain [N:0] from an external device. In the Step S2 in FIG. 9, a plurality of the memory cells 21 are selected by the row address decoder 25 and the column address decoder 20, and the data stored in the selected memory cell 21 are read-out. In the Step S3 in FIG. 9 at the time t2 in FIG. 5, the read-out data from the selected memory cell 21 are amplified by the read AMP 32, and then the read AMP 32 outputs the amplified signal AMP_OUT [N:0] to the data latch circuit 58. The amplified signal AMP_OUT [N:0] is held in the data latch circuit 58, in the Step S6 in FIG. 9 at the time t3. On the other hand, in response to the input address Ain [N:0], the selection circuit 40 outputs the fail bit selection signal FAIL_BIT_SELECT [N:0] to the error making circuits 50A.

Under the general operation ("Yes" in the Step S4 in the FIG. 9), the test mode signal ECCFunction, which is outputted from the test command circuit 45, is inactivated. Thus, as shown in FIG. 8, the latched signal LATCH_OUT [N:0] is transferred via the NAND gates 55 and 56, and is outputted as the ECC-in signal ECC_IN [N:0]. Then, in the Step S7 in FIG. 9, if the ECC 59 detects the bit error in the ECC-in signal ECC_IN [N:0] outputted from the error making circuit 50 A, one-bit error is corrected by the ECC 59. If the ECC 59 detects no bit error in the ECC-in signal ECC_IN [N:0], then the ECC-in signal ECC_IN [N:0] is not corrected and is outputted as the output data DATA_OUT [N:0] following "No" in the Step S8 in FIG. 9. As described above, under the general operation, since the latched signal LATCH_OUT [N:0], which has been stable in the data latch circuit 58, is simply transferred to the ECC 59 through the error making circuits 50A, the general read-out operation is performed smoothly without making any time delay or another problem.

To the contrary, under the non-general operation ("No" in the Step S4 in the FIG. 9), the test mode signal ECCFunction, which is outputted from the test command circuit 45, is activated, and one of the error making circuits 50A is selected. In Step S5 in FIG. 9, the latched signal LATCH_OUT [N] is inverted by the inverter 53 and the NAND gates 54 and 56, and then the inverted signal is outputted from the selected error making circuit 50A as the ECC-in signal ECC_IN [N]. As a result, in the Step S6 in FIG. 9 at the time t3 in FIG. 5, data having one (1)-bit error are stored in the signal to be inputted into the ECC.

For this reason, the ECC-in signal ECC_IN[N:0] outputted from the error making circuit 50 A includes one (1)-bit error. When such the ECC-in signal ECC_IN[N:0] having one (1)-bit error is inputted into the ECC 59 in the Step S7 in FIG. 9 during the time t3t 4, the arithmetic operation for correction is performed in the ECC 59. Thus, in the Step 8 in FIG. 9, it is possible to evaluate the output data DATA_OUT [N:0] at the access timings including the timing t5 of FIG. 5, at which delay caused by the arithmetic operation has occurred. Furthermore, since the selected error making circuit 50A makes an error bit in the desired memory cell 21, the access evaluation for all kinds of error patterns, including the time delay for the arithmetic operation for correction of each error pattern, can be performed by repeating the operation following "No" in the Step S9 in FIG. 9.

A specific process sequence of the access evaluation method shown in FIG. 9 of the nonvolatile memory 200 is performed in substantially the same flow illustrated in FIG. 6.

[Advantage]

According to the second embodiment of the invention, since the error making circuits 50A for making a one-bit error is formed between the data latch circuit 58 and the ECC 59, it is possible to hold the amplified signal AMP_OUT [N:0], which was amplified by the read AMP 32, in the data latch circuit 58 stably. Further, since it is possible to include one-bit error signal ERROR SIGNAL intentionally in the data ECC_IN [N:0], which are inputted to the ECC 59, the access evaluation including the delay caused by the arithmetic operation for correction can be performed in advance before the shipment of the nonvolatile memory 100 so that the evaluation satisfying the access standard to the sample products can be performed.

The Third Embodiment

According to the nonvolatile memories 100 and 200 of the first and the second embodiment shown in FIG. 1 and FIG. 7, since the selection circuit 40 used in either nonvolatile memory 100 or 200 can select the desired one of the memory cells, it is possible to evaluate the delay caused by the arithmetic operation for one-bit correction to the single data group (for example, 128-bit data [127:0]-0 are considered as a single data group where Y=128 in the memory cells 21 [Y:0]-0-21 [Y:Y]-0 whose gates are connected to the word line WL 0). However, under such a method of access evaluation, the operation for correcting one-bit error is performed one-hundred twenty eight (128) times to the single data group. Thus, the delay testing time for correction takes 128 times longer, and the scale of the circuit increases.

According to the third embodiment, in order to reduce the testing time and the scale of the circuit, an all-bit rescuing test is not performed for the single data group. Instead, as described below, the evaluations are performed by shifting the location of the one-bit error in each single data group.

Figure 10:
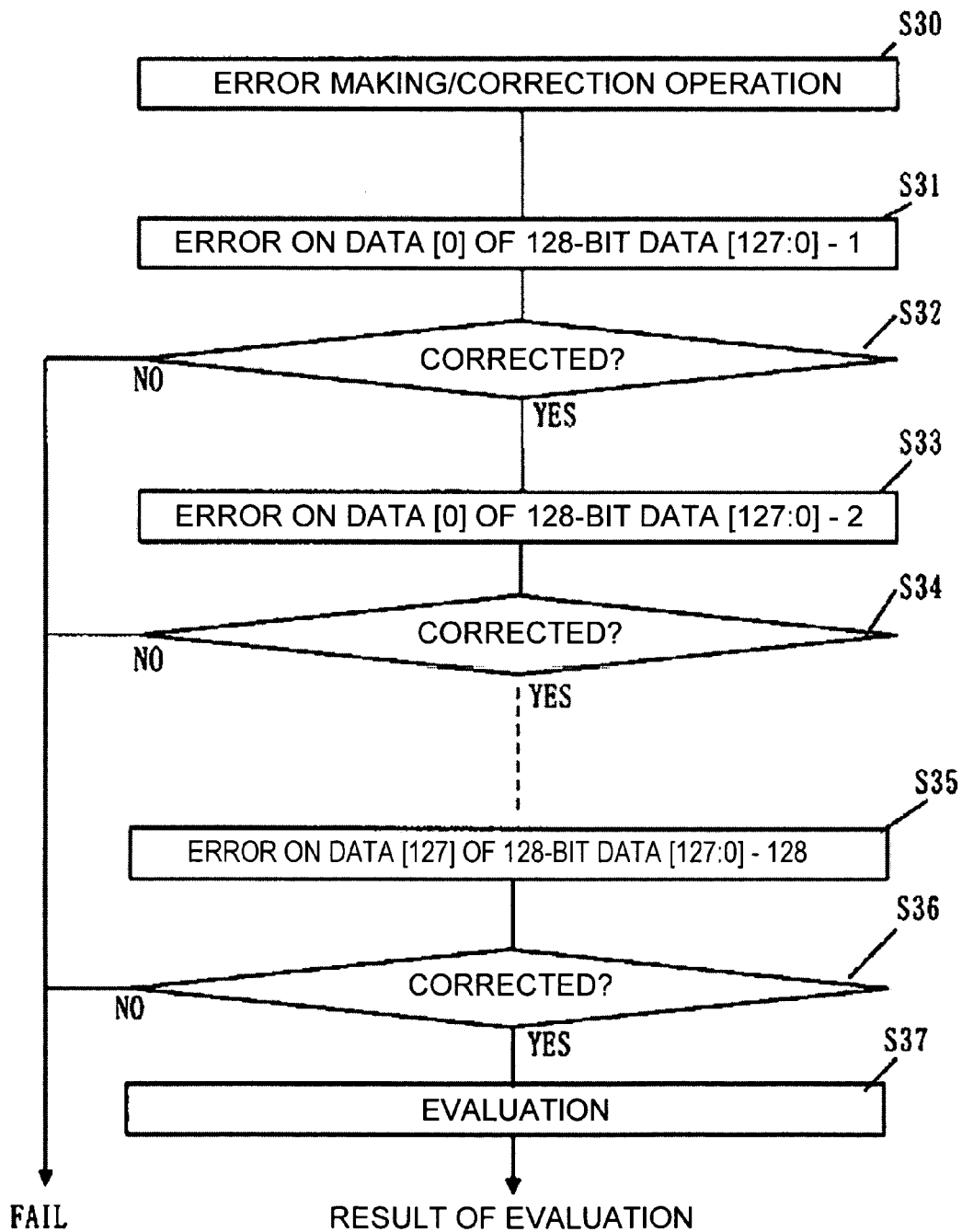
FIG. 10 is a flow chart showing a specific process sequence of a method of an access evaluation for an asynchronous nonvolatile semiconductor memory, according to a third embodiment.
Figure 11:
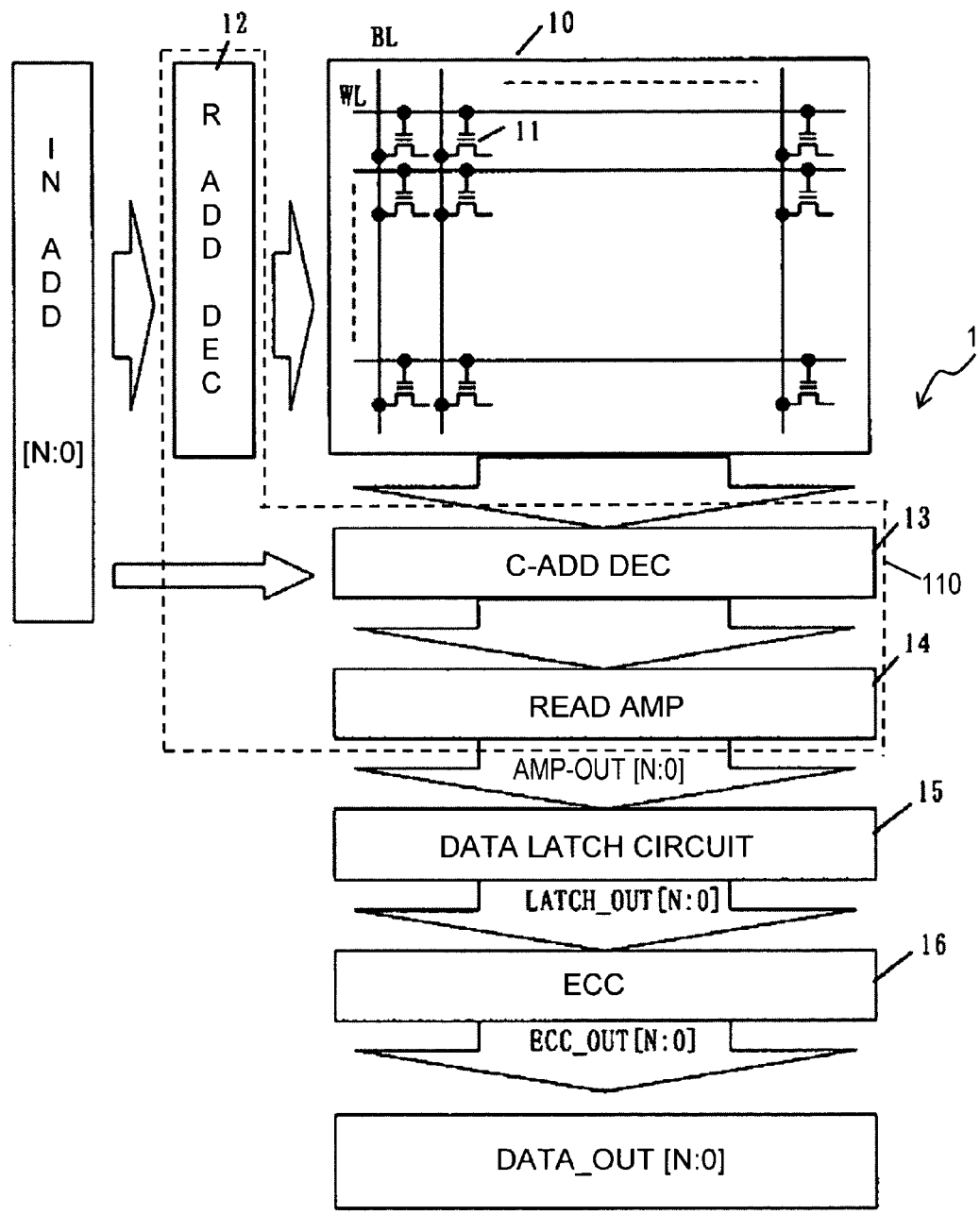
FIG. 11 is a circuit diagram of an asynchronous nonvolatile memory having an error correcting function in the related arts.
Figure 12:
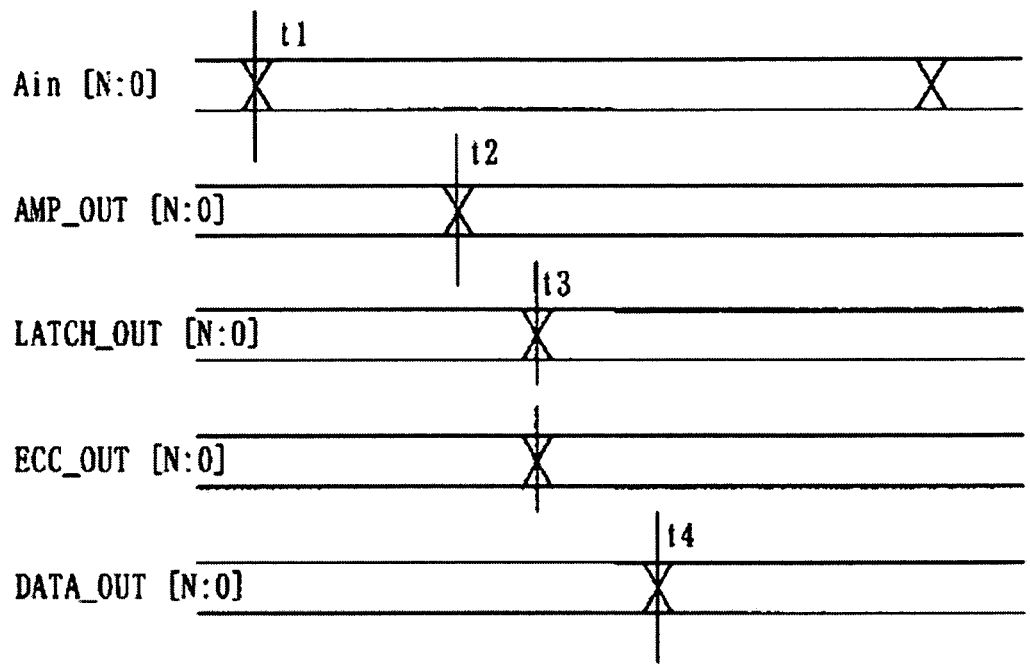
FIG. 12 is a timing chart showing the read-out operation of the nonvolatile memory of FIG. 1 in the case that there is no defects in a selected memory cell.
Figure 13:
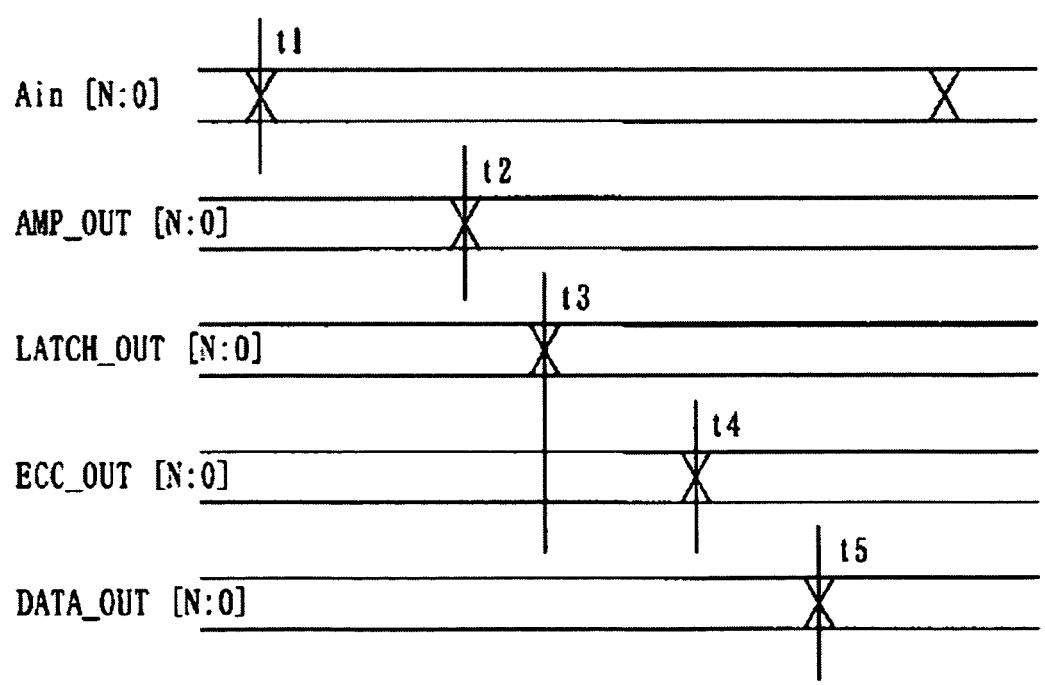
FIG. 13 is a timing chart showing a read-out operation of the nonvolatile memory of FIG. 1 in the case that the there is a defect in a selected memory cell 11.

FIG. 10 is a flow chart showing a specific process sequence of a method of an access evaluation for an asynchronous nonvolatile semiconductor memory, according to the third embodiment.

In the asynchronous nonvolatile semiconductor memory of the third embodiment, the signal inputted to the column address decoder 30 which includes a multiplexer is also used as the signal inputted to the selection circuit 40 so that the scale of the circuit can be reduced. According to the nonvolatile memory of the third embodiment, since the fail bit selection signal FAIL_BIT_SELECT [N:0] outputted from the selection circuit 40 has a relationship with the column address decoder 30, as described above, the location of the one-bit error in each single data group is different.

For example, in the case that the number of word lines WL is set at one-hundred twenty eight and the number of memory cells 21 connecting each of the word lines is set at "(Y+1)= one-hundred twenty eight", "(Y+1)=one-hundred twenty eight" error making circuits 50 or 50A make an error on the first memory cell 21 [127:0]-0 in the first single data group and the EGG 59 outputs the corrected signals, in the Steps S30-S32 of FIG. 10. Then, in the Steps S33-S34 of FIG. 10, the error making circuits 50 or 50A make an error on the second memory cell 21 [127:1]-1 in the second single data group and the EGG 59 outputs the corrected signals. In other words, the first memory cell and the second memory cell are selected by different word lines and by different bit lines; namely, they are located at different locations. After that, the error making circuits 50 or 50A make an error on the third memory cell 21 [127:3]-3 in the third single data group through the one-hundred twenty eighth memory cell 21 [127-127]-127 in the one-hundred twenty eighth single data group and the ECC 59 outputs the corrected signals at each time, in the Steps S35-Step S36 of FIG. 10. Then, in the Step S37 of FIG. 10, data that are read-out from each memory cell 21 [127:0]-0, 21 [127:1]-1, 21 [127:2]-2~21 [127:127]-127 connecting one of the word lines WL0-WL127, are evaluated at the timings including the delay caused by the arithmetic operation for corrections. If the answer is "NO" in one of the Steps S32, S34 and S36, then the nonvolatile memory 100 under the test mode is judged as defective (FAIL).

It is possible to correct one-bit error in all single data group, and the testing time is substantially the same as a comparing test of the memory cells 21.

According to the third embodiment, it is possible to reduce the testing time and the scale of the circuit.

While the invention has been described with reference to illustrative embodiments, this description is not intended to be construed in a limiting sense. Thus, shapes, size and physical relationship of each component are roughly illustrated so the scope of the invention should not be construed to be limited to them. Further, to clarify the components of the invention, hatching is partially omitted in the cross-sectional views. Moreover, the numerical description in the embodiment described above is one of the preferred examples in the preferred embodiment so that the scope of the invention should not be construed to limit to them.

For example, although the an asynchronous nonvolatile semiconductor memory used in the first through the third embodiments is an EPROM, the invention can be applied to a Mask ROM (Read Only Memory), a PROM (Programmable Read Only Memory), an EPROM (Electrically Programmable Read Only Memory), an $E^2$PROM (Electrically Erasable Programmable Read Only Memory), a FeRAM (Ferroelectric Random Access Memory) and a Flash memory, and a memory cell array can be modified in response to a kind of the nonvolatile memory. Further, the selection circuit 40 shown in FIG. 2 and the error making circuits 50 or 50A shown in FIG. 3 or FIG. 8 can be changed to other circuit configuration. Moreover, the specific process sequence of the access evaluation method shown in FIGS. 4, 6, 7, and 10 can be changed to other sequences.

Various other modifications of the illustrated embodiment will be apparent to those skilled in the art on reference to this description. Therefore, the appended claims are intended to cover any such modifications or embodiments as fall within the true scope of the invention.

We claim:

1. A nonvolatile semiconductor memory, comprising:
a memory cell array including a plurality of nonvolatile memory cells;
a read-out circuit outputting data stored in the memory cell array asynchronously in response to an input address signal;
a data latch circuit latching the data outputted from the read-out circuit and outputting the latched data;
an error correcting circuit detecting an error in the latched data, correcting the error, and outputting the corrected signal;
a selection circuit outputting a selection signal for selecting a location of the memory cell to fail; and
an error making circuit receiving a test mode signal, making either the data outputted from the read-out circuit or the latched data fail and transmitting the failed data to a certain circuit in the next stage in response to the selection signal when the test mode signal is activated, and transmitting either the data outputted from the read-out circuit or the latched data to the certain circuit in the next stage when the test mode signal is not activated.

2. A nonvolatile semiconductor memory as claimed in claim 1,
wherein the error correcting circuit detects and corrects a one-bit error in the latched data, wherein the selection circuit selects a location of the memory cell in which the one-bit error is caused in response to the input address signal, and outputs the selection signal, and
wherein the error making circuit makes the one-bit error in the data outputted from the read-out circuit or the latched data when the test mode signal is activated.

3. A nonvolatile semiconductor memory, comprising:
a memory cell array including a plurality of nonvolatile memory cells;
a read-out circuit outputting data stored in the memory cell array asynchronously in response to an input address signal;
a selection circuit outputting a selection signal for selecting a location of the memory cell to fail;
an error making circuit receiving a test mode signal, making the data outputted from the read-out circuit fail so that the failed data have an error, and outputting the failed data in response to the selection signal when the test mode signal is activated, and outputting the data outputted from the read-out circuit when the test mode signal is not activated;
a data latch circuit latching either the failed data or the data outputted from the read-out circuit and outputting the latched data;
an error correcting circuit detecting the error in the latched data, correcting the error, and outputting the corrected signal.

4. A nonvolatile semiconductor memory as claimed in claim 3,
wherein the error correcting circuit detects and corrects a one-bit error in the latched data,
wherein the selection circuit selects a location of the memory cell in which the one-bit error is caused in response to the input address signal, and outputs the selection signal, and
wherein the error making circuit makes the one-bit error in the data outputted from the read-out circuit or the latched data when the test mode signal is activated.

5. A nonvolatile semiconductor memory as claimed in claim 3, wherein the selection circuit includes a plurality of first inverters inverting the input address signal,
a plurality of NAND gates, each NAND gate receiving a different combination of the input address signal and output signals of the first inverters, and
a plurality of second inverters inverting outputs of the NAND gates and outputting the inverted signal of the outputs of the NAND gates to the error making circuit.

6. A nonvolatile semiconductor memory as claimed in claim 3, wherein the error making circuit, which performs an arithmetic operation, includes
a first two-input NAND gate whose inputs receive the test mode signal and the selection signal,
a first inverter inverting an output of the first two-input NAND gate,
a second inverter inverting the output data from the read-out circuit,
a second two-input NAND gate whose inputs receive outputs of the first and the second inverters,
a third two-input NAND gate whose inputs receive the output of the first two-input NAND gate and the output data from the read-out circuit, and
a fourth two-input NAND gate whose inputs receive outputs of the second and third NAND gates, the fourth two-input NAND gate outputting a result of the arithmetic operation to the data latch circuit.

7. A nonvolatile semiconductor memory, comprising:
a memory cell array including a plurality of nonvolatile memory cells;
a read-out circuit outputting data stored in the memory cell array asynchronously in response to an input address signal;
a data latch circuit latching the data outputted from the read-out circuit and outputting the latched data;
a selection circuit outputting 4 selection signal for selecting a location of the memory cell to fail;
an error making circuit receiving a test mode signal, making the latched data fail and outputting the failed data in response to the selection signal when the test mode signal is activated, and outputting the latched data when the test mode signal is not activated; and
an error correcting circuit detecting the error in the data outputted from the error making circuit, correcting the error, and outputting the corrected signal.

8. A nonvolatile semiconductor memory as claimed in claim 7,
wherein the error correcting circuit detects and corrects a one-bit error in the latched data,
wherein the selection circuit selects a location of the memory cell in which the one-bit error is caused in response to the input address signal, and outputs the selection signal, and
wherein the error making circuit makes the one-bit error in the data outputted from the read-out circuit or the latched data when the test mode signal is activated.

9. A nonvolatile semiconductor memory as claimed in claim 7, wherein the selection circuit includes
a plurality of first inverters inverting the input address signal,
a plurality of NAND gates, each NAND gate receiving a different combination of the input address signal and output signals of the first inverters, and
a plurality of second inverters inverting outputs of the NAND gates and outputting the inverted signal of the outputs of the NAND gates to the error making circuit.

10. A nonvolatile semiconductor memory as claimed in claim 7, wherein the error making circuit, which performs an arithmetic operation, includes
a first two-input NAND gate whose inputs receive the test mode signal and the selection signal,
a first inverter inverting an output of the first two-input NAND gate,
a second inverter inverting the output data from the read-out circuit,
a second two-input NAND gate whose inputs receive outputs of the first and the second inverters,
a third two-input NAND gate whose inputs receive the output of the first two-input NAND gate and the output data from the read-out circuit, and
a fourth two-input NAND gate whose inputs receive outputs of the second and third NAND gates, the fourth two-input NAND gate outputting a result of the arithmetic operation to the error correction circuit.

11. A method of an access evaluation of the nonvolatile semiconductor memory, comprising:
reading out data asynchronously, which are stored in a memory cell array having a plurality of memory cells, in response to an input address;
making one bit of the data, which were read out asynchronously, fail in response to a selection signal, which is generated by the input address, so that a one-bit error occurs at said one bit, for selecting a location of the memory cell to fail in a test mode, and latching the read-out data including the failed data in a latch circuit;
detecting and correcting the one-bit error in the failed data of the latched data in an error correcting circuit; and
performing an access evaluation for all kinds of patterns of failed data or a predetermined patterns of failed data to be inputted in the error correcting circuit including time delay for the failed data correction by repeating the above steps.

12. A method of an access evaluation of the nonvolatile semiconductor memory as claimed in claim 11, wherein the selection signal is generated by a column address of the input address.

13. A method of an access evaluation of the nonvolatile semiconductor memory, comprising:
reading out data asynchronously, which are stored in a memory cell array having a plurality of memory cells, in response to an input address;
latching the read-out data, and making one bit of the latched data fail in response to a selection signal, which is generated by the input address, so that a one-bit error occurs at said one bit, for selecting a location of the memory cell to be failed fail in a test mode;
detecting and correcting the latched data including the one-bit error in the failed data in an error correcting circuit; and
performing an access evaluation for all kinds of patterns of failed data or predetermined patterns of failed data to be inputted in the error correcting circuit, said all kinds of patterns or said predetermined patterns of failed data including a time delay for the failed data correction by repeating the above steps.

14. A method of an access evaluation of the nonvolatile semiconductor memory as claimed in claim 13, wherein the selection signal is generated by a column address of the input address.

* * * * *